United States Patent [19]
Steuerwald et al.

[11] Patent Number: 5,496,633
[45] Date of Patent: Mar. 5, 1996

[54] TRANSFER FILM WITH MAGNETIC LAYER

[75] Inventors: Manfred Steuerwald; Manfred Ohlinger, both of Frankenthal; Jenoe Kovacs, Hessheim; Dieter Schwarz, Weinheim, all of Germany

[73] Assignee: BASF Aktiengesellschaft, Ludwigshafen, Germany

[21] Appl. No.: 735,701

[22] Filed: Jul. 25, 1991

Related U.S. Application Data

[63] Continuation of Ser. No. 429,505, Oct. 31, 1989, abandoned.

[30] Foreign Application Priority Data

Dec. 15, 1988 [DE] Germany .......................... 38 42 176.3

[51] Int. Cl.⁶ ....................................................... G11B 5/00
[52] U.S. Cl. .................... 428/336; 428/425.9; 428/692; 428/693; 428/694 BP; 428/900; 428/914; 428/922; 360/2; 235/493; 283/904
[58] Field of Search ................................... 428/694, 900, 428/336, 692, 693, 964, 922, 694 BP, 425.9, 413, 522, 482; 427/128, 47, 48; 360/2; 235/493; 283/904, 82

[56] References Cited

U.S. PATENT DOCUMENTS

| | | | |
|---|---|---|---|
| 3,293,066 | 12/1962 | Haines | 117/68 |
| 3,497,411 | 2/1970 | Chebiniak | 156/234 |
| 3,677,817 | 7/1972 | Muri et al. | 117/235 |
| 3,838,252 | 9/1974 | Hynes et al. | 235/61.12 M |
| 4,297,570 | 10/1981 | Kowalski et al. | 235/493 |
| 4,376,006 | 3/1983 | Nishikawa et al. | 156/233 |
| 4,613,520 | 9/1986 | Dasgupta | 427/128 |
| 4,624,892 | 11/1986 | Ishizaki et al. | 428/323 |
| 4,631,223 | 12/1986 | Sander | 428/172 |
| 4,923,848 | 5/1990 | Akada et al. | 428/914 |

FOREIGN PATENT DOCUMENTS

WO87/06745  11/1987  WIPO.

*Primary Examiner*—Stevan A. Resan
*Attorney, Agent, or Firm*—Keil & Weinkauf

[57] ABSTRACT

A transfer film having a magnetic layer consists essentially of a substrate film, a parting layer and a transfer layer which is detachable from the said parting layer and is formed by one or more magnetic layers, and, on that side of the magnetic layer which faces the substrate film, after detachment of the substrate film, the surface-forming layer consists of a top layer which contains inorganic pigments in a cross-linked polymer matrix and has a thickness of from 0.2 to 5.0 μm and a surface resistance of from $10^{-1}$ to $10^{-8}$ ohm/cm.

3 Claims, No Drawings

TRANSFER FILM WITH MAGNETIC LAYER

This application is a continuation of application Ser. No. 429,505, filed on Oct. 31, 1989 now abandoned.

The present invention relates to a transfer film having a magnetic layer, consisting essentially of a substrate film, a parting layer and a transfer layer which is detachable from the parting layer and has at least one magnetic layer.

Transfer films, also referred to as stamping films, are widely used for the production of credit cards, identity cards, travel tickets, etc. They essentially consist of a substrate film and a transfer layer which is detachable from the said film and, in the simplest case, consists of a magnetic layer having magnetizable material in a binder matrix. If necessary, an adhesive layer may be applied to that side of the transfer film which faces away from the substrate film, the said adhesive layer serving to fix the transfer layer on the substrate to be provided with the said transfer layer.

Stamping films, in particular hot stamping films, consisting of a magnetic layer and further layers intended for inscription are described in DE-A 34 22 911. U.S. Pat. No. 4,376,006 discloses that a metal layer and a layer of adhesion-promoting components can be provided on that side of the magnetic layer which faces the substrate film. This embodiment is intended to make it possible to produce a magnetic stamping film in light colors too, the generally dark magnetic layer being covered by the metal layer. A procedure of this type serves entirely decorative purposes.

WO 87/06745 describes a similar procedure. Here, too, a top layer is applied on that side of the magnetic layer which faces the substrate film, the said top layer, because of its capacity, being intended to cover the specially arranged magnetic and nonmagnetic tracks present on or in the information medium.

However, many of these information media provided with a transfer layer are easily damaged and may become useless during varied use under unfavorable general conditions. Examples here are parking permits, tickets and credit cards. This type of damage or even destruction is due to both the sensitivity to scratching and the attraction of dirt by the transfer layer. Thus, foreign particles collect on the surface of the transferred magnetic layer and cause mechanical damage which finally leads to signal loss.

It is an object of the present invention to overcome this disadvantage.

We have found that this object is achieved by transfer films having a magnetic layer, consisting essentially of a substrate film, a parting layer and a transfer layer which is detachable from the said parting layer and comprises at least one magnetic layer, if, on that side of the magnetic layer which faces the substrate film, after detachment of the substrate film, the surface-forming layer consists of a layer which contains inorganic pigments in a crosslinked polymer matrix and has a thickness of from 0.2 to 5.0 µm and a surface resistance of from $10^1$ to $10^8$ ohm/cm.

The novel transfer films permit the formation of a scratch-resistant, antistatic surface layer on that part of the information medium which is formed by the transfer layer. This prevents mechanical damage and the attraction of dirt during conventional use of the special information media and greatly reduces the danger of losing data stored in the magnetic layer. In the novel transfer films, these special nonmagnetic surface layers result in no signal loss or only insignificant signal loss in the window area according to ISO standards 3554 and 7811.

The novel transfer film is essentially produced by the known procedure. Thus, the substrate film, in general a polyethylene terephthalate film, is coated with a 0.1–0.5 µm thick parting layer. This parting layer generally consists of polyvinylalkyl carbamate, polyglyceryl stearate, polyvinyl octadecyl ether or similar compounds known for this purpose.

The transfer layer is then applied to this parting layer. For this purpose, the special top layer, which forms the surface layer after transfer of the transfer layer to the substrate intended for the information medium, is first prepared.

The top layer advantageously consists of a cross-linked polymer matrix which contains finely divided inorganic pigments, with the result that the layer has not only greater mechanical stability but also a lower surface resistance. Examples of suitable inorganic pigments are carbon black, tin dioxide, lithium chloride, nonmagnetic iron oxides and the known substances capable of forming conductive centers. These materials are dispersed in a solution of the polymeric binder in a known manner, applied in a layer thickness of from 0.2 to 5.0 µm, preferably from 0.3 to 2.0 µm, by means of a dispersion knife coater and then crosslinked in a known manner. Suitable binders include the known polyurethanes, epoxy resins, polyvinyl alcohol derivatives, vinyl chloride copolymers, nitrocellulose, polyesters, polyesters having sulfonate groups, polymers having acrylate groups, which can be cured by chemical or electron beam crosslinking, the said substances being used alone or as mixtures.

Finally, the magnetic layer is applied to this top layer. The magnetic layer consists of a dispersion of, in general, acicular materials, for example modified or unmodified gamma-iron oxides, chromium dioxide, ferro-magnetic metal particles or acicular or tabular hexagonal ferrites of the barium ferrite type, in a polymer binder, for example polyurethane, and various coating assistants. Magnetic dispersions of this type are known, as are methods for applying them to a substrate.

Depending on the intended use, an adhesive layer may be applied to this magnetic layer, by means of which adhesive layer the transfer layer is subsequently fastened to the substrate of the information medium.

The stated structure of the novel transfer film can be varied in the conventional and known manner for such information media. The top layer which forms the surface after transfer of the transfer layer is essential and is required for achieving the object of the invention. This hard, scratch-resistant and antistatic top layer extends over the entire surface of the magnetic layer. It prevents early errors when the magnetic cards are used frequently. The antistatic top layer furthermore makes it more difficult to forge the data stored in the magnetic stripes, since the magnetic layer and the top layer can scarcely be separated from one another. On the other hand, the presence of such conductive top layers can readily be detected by measuring the surface resistance. Another advantage of these surface-forming layers is that, after they have cured, these layers can no longer be attacked by organic solvents, so that the top layer can very readily be printed with ink films.

The Examples which follow illustrate the invention.

EXAMPLE 1

20 parts of a 12.5% strength solution of a commercial polyurethane, obtained from a polyesterol and a polyisocyanate, and 22 parts of a 20% strength solution of a commerical polyvinyl chloride, in each case in tetrahydrofuran, together with 30 parts of carbon black, 8 parts of nonmagnetic iron oxide as a dulling agent and one part of myristic acid were dispersed with 400 parts of tetrahydrofuran and 75 parts of cyclohexanone in a stirred mill. Dispersing was continued until the maximum gloss of hand coatings of the dispersion was obtained. Before further processing, 10 parts of an adduct of 522 parts of toluylene diisocyanate and 134 parts of trimethylolpropane (50% strength in tetrahydrofuran) were added to the dispersion, which was stirred for 20 minutes and then discharged.

EXAMPLE 2

An 11.5 μm thick polyethylene terephthalate film was first provided with a 0.3 μm thick polyglyceryl stearate parting layer by means of an engraved roller. This layer was then coated with the dispersion described in Example 1 by means of an engraved roller. The layer thickness was 0.6 μm. A magnetic dispersion based on barium ferrite was then applied thereon in such a way that a 12.5 μm thick magnetic layer resulted. The transfer film thus produced was transferred to credit cards using heat and pressure.

The Hc value of the magnetic layer was 302 kA/m and the residual induction was 130 mT. The surface resistance of the transferred layer was $-3\times10^3$ ohm/square.

COMPARATIVE EXPERIMENT 1

The production of the transfer film was repeated, except that a top layer was not applied. The Hc value of the resulting transfer layer was 299 kA/m and the residual induction was 128 mT. The surface resistance was determined as $10^{-10}$ ohm/square.

The magnetic cards obtained in Example 2 and Comparative Experiment 1 were tested on a Rinas tester. The reading voltage curves according to ISO standard 7811 were identical. However, there were substantial differences in the mechanical strength of the magnetic stripes. The magnetic card without a top layer (Comparative Experiment 1) had from 15 to 20 errors after 30 passes on a commercial write/read apparatus (Olivetti), while the magnetic card according to Example 2 showed no errors even after 500 passes.

EXAMPLE 3

A transfer film consisting of a $\gamma\text{-Fe}_2\text{O}_3$ magnetic dispersion and the top layer dispersion according to Example 1 was produced as described in Example 2. The thickness of the magnetic layer was 15 μm and that of the top layer was 1.2 μm. The Hc value of the transfer layer was 24 kA/m and the residual induction was 93 mT. The surface resistance of the transferred layer was $1.8\times10^4$ ohm/square.

COMPARATIVE EXPERIMENT 2

A transfer film without a top layer was produced as described in Example 3. The Hc value of the transfer layer was 25 kA/m and the residual induction was 95 mT. The comparative tests on a read voltage tester showed no differences in the read voltage curves according to ISO 7811. A surface resistance of $8\times10^9$ ohm/square was determined.

In continuous operation, the magnetic card according to Comparative Experiment 2 showed substantial head marks after only 450 measuring units, whereas there was no detectable damage at all on the card according to Example 3 after 500 measurements.

We claim:

1. A transfer film having a magnetic layer, consisting essentially of a substrate film, a parting layer and a transfer layer which is detachable from the said parting layer and comprises at least one magnetic layer wherein, on that side of the magnetic layer which faces the substrate film, after detachment of the substrate film, the surface-forming layer consists of a layer which contains inorganic pigments in a crosslinked polymer matrix and has a thickness of from 0.2 to 5.0 μm and a surface resistance of $10^1$ to $10^8$ ohm/square.

2. A transfer film as defined in claim 1, wherein the inorganic pigment is selected from the group consisting of carbon black, tin dioxide, nonmagnetic iron oxides, lithium chloride and mixtures thereof.

3. A transfer film as defined in claim 2, wherein the crosslinked polymer matrix is obtained by reacting at least one binder from the group consisting of the polyurethanes, epoxy resins, vinyl chloride copolymers and polyesters with a polyisocyanate.

\* \* \* \* \*